US008085126B2

(12) United States Patent
Determan et al.

(10) Patent No.: US 8,085,126 B2
(45) Date of Patent: Dec. 27, 2011

(54) IDENTIFICATION WITH RFID ASSET LOCATOR FOR ENTRY AUTHORIZATION

(75) Inventors: Gary E. Determan, Maple Grove, MN (US); Bruce W. Anderson, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 284 days.

(21) Appl. No.: 12/414,584

(22) Filed: Mar. 30, 2009

(65) Prior Publication Data

US 2009/0237203 A1 Sep. 24, 2009

Related U.S. Application Data

(63) Continuation-in-part of application No. 10/901,410, filed on Jul. 27, 2004, now abandoned.

(51) Int. Cl.

| | |
|---|---|
| ***G05B 19/00*** | (2006.01) |
| ***G06F 7/00*** | (2006.01) |
| ***G06K 19/00*** | (2006.01) |
| ***H04B 1/00*** | (2006.01) |
| ***H04L 9/14*** | (2006.01) |
| ***H04Q 1/00*** | (2006.01) |

(52) U.S. Cl. ....... 340/5.2; 340/5.52; 340/10.1; 340/571; 340/568.1; 340/573.1

(58) Field of Classification Search .................. 340/5.2, 340/5.52, 5.82, 10.1, 572, 522, 568, 573.1, 340/632; 713/186, 200, 176; 235/380
See application file for complete search history.

(56) References Cited

U.S. PATENT DOCUMENTS

| | | | |
|---|---|---|---|
| 5,629,981 | A | 5/1997 | Nerlikar |
| 5,708,423 | A | 1/1998 | Ghaffari et al. |
| 5,886,634 | A | 3/1999 | Muhme et al. |
| 5,903,225 | A | 5/1999 | Schmitt et al. |
| 6,041,410 | A | 3/2000 | Hsu et al. |
| 6,195,006 | B1 | 2/2001 | Bowers et al. |

(Continued)

FOREIGN PATENT DOCUMENTS

WO WO 01/65478 A2 9/2001

OTHER PUBLICATIONS

Landt, J., "Shrouds of Time: The history of RFID," *AIM Publication* (2001) AIM, Inc., Pittsburgh, PA., Oct. 1.

*Primary Examiner* — Nam V Nguyen
(74) *Attorney, Agent, or Firm* — Kermit D. Lopez; Luis M. Ortiz; Ortiz & Lopez, PLLC

(57) ABSTRACT

A system for controlling access at secure facilities to locations and assets contained in those locations, comprising a biometric identification device, an RFID tag and receiver, and a database for processing information from them to allow or deny access to the locations and assets. The system ties into an existing network in the facility and also includes a programming device for evaluation of the biometric template and acknowledgement of the identification, if made. The system also controls the permissible locations of assets such as laptops, desktop computers, photographic equipment, weapons such as rifles, data storage devices and the like, such that while a person may have access to a location, use of an asset or removal of the asset may not be part of that person's authorized conduct.

19 Claims, 2 Drawing Sheets

U.S. PATENT DOCUMENTS 6,223,461 B1 * 5/2001 Mardirossian ............... 42/70.11
6,300,872 B1 * 10/2001 Mathias et al. ............... 340/540
6,484,260 B1 11/2002 Scott et al.
6,580,356 B1 * 6/2003 Alt et al. ........................ 340/5.8
6,623,739 B1 * 9/2003 Momin et al. ............. 424/184.1
6,624,739 B1 9/2003 Stobbe
6,703,918 B1 * 3/2004 Kita ............................ 340/5.52
6,720,861 B1 * 4/2004 Rodenbeck et al. ......... 340/5.64
6,747,564 B1 6/2004 Mimura et al.
6,774,782 B2 8/2004 Runyon et al.
6,819,219 B1 11/2004 Bolle et al.
6,850,147 B2 2/2005 Prokoski et al.
6,867,683 B2 3/2005 Calvesio et al.
6,925,565 B2 8/2005 Black
6,972,660 B1 12/2005 Montgomery, Jr. et al.
7,069,444 B2 * 6/2006 Lowensohn et al. .......... 713/185
7,230,519 B2 * 6/2007 Coughlin et al. ............ 340/5.82
7,356,706 B2 * 4/2008 Scheurich ..................... 713/186
2003/0076230 A1 4/2003 Runyon et al.
2004/0129787 A1 7/2004 Saito et al.
2004/0139348 A1 * 7/2004 Norris, Jr. ..................... 713/200

* cited by examiner

IDENTIFICATION WITH RFID ASSET LOCATOR FOR ENTRY AUTHORIZATION

RELATED PATENT APPLICATIONS

This application is a Continuation-In-Part (CIP) under 25 U.S.C. §120 of U.S. patent application Ser. No. 10/901,410, filed on Jul. 27, 2004 and titled: "Identification with RFID asset locator for entry authorization", now abandoned.

TECHNICAL FIELD

Embodiments relate a system using biometric information from persons in combination with a radio frequency identification device and, more particularly, to a system for maintaining control over access to secure areas and to control of movement of valued assets.

BACKGROUND OF THE INVENTION

A secure building typically has many types of access that need to be controlled. It has become impractical to have a guard on station at every access point, particularly where doors are locked unless and until proper access is provided. Even buildings that employ human guards at the main entrance do not find the cost of several dozen or more guards at various other locations to be practical or affordable. Many times valuable assets are removed without the knowledge of the guard. An example would be someone carrying out a laptop. It would be an advantage if an alarm would protect the asset. The most common form of access control to these other areas are card readers and key pads.

The problems with card readers are that they are expensive and only as secure as the person possessing the card. Anyone having the card can gain access to the area. A lost or stolen card is a serious security issue.

The problem with keypads is the need to protect and maintain the keypad combinations. Combinations can be stolen or guessed, particularly if the individual does not use a random selection. A stolen combination could be used for an extended period of time before the theft is detected.

RFID tags are well known devices for electronically tagging an item or individual. RFID stands for (Radio Frequency Identification Device) which can lead to misunderstandings as to what exactly an RFID tag is. For example, an aircraft transponder is a device that transmits a radio frequency signal that is intended to uniquely identify an aircraft. Aircraft transponders are not, however, RFID tags.

RFID tags are low powered devices of limited range that are covered by international standards. Different standardized variations are powered RFID tags, non-powered RFID tags, vicinity cards, proximity cards, and close coupled cards. Powered RFID tags contain a power source such as a battery. Non-powered RFID tags are generally powered by an interrogation signal. RFID tags most commonly communicate within a 14 kHz band centered at 13.56 MHz because low powered devices can legally operate without a license within that band. In the U.S., such operation is permitted under 47 C.F.R. §15.225.

Two of the international standards bodies that have published standards covering RFID tags (a.k.a. RFID cards) are the International Organization for Standardization with its well known ISO standards and the International Electrotechnical Commission with its well known IEC standards. ISO/IEC 14442 is an international standard governing proximity cards. Vicinity cards are covered by ISO/IEC 15693 and close coupled cards are covered by ISO/IEC 10536. The later follow on standards for the various types of RFID cards and tags are at least partially derivative of at least one of the above mentioned international standards.

There have been some efforts to use other methods than card readers and keypads. Ortiz et al. Publication No. 2003/0163710 discloses a system using biometric authentication using fingerprint, iris and other identities, sometimes in combination, to identify the user. Ortiz also discloses the use of RFID tags such as on badges. Access is either permitted or denied. The reference simply seeks to authenticate a person's identity, for use with ATMs, banks, work stations and the like. Ortiz et al. does not seek to protect assets from being moved from one location to another.

Kocher Publication No. 2004/0002894 discloses an identification system using three factors of authentication, including iris and fingerprint, for use with RFID units. A first identification uses the RFID unit, then biometric identity is presented and identified. If positive, a third factor consisting of a special position of the biometric is compared to the actual position. A match gains access. Again asset location does not appear to be disclosed and access is the only requirement being determined.

Bowers et al. U.S. Pat. No. 6,693,539 discloses the use of RFID tags in a library or other place for handling articles in which each book or other object has its own tag that can be accessed as needed to determine its presence or absence. One advantage of Bowers et al is the ability to determine use of the book within the facility by checking locations during open hours to provide data on which books are consulted but not checked out.

Finally, Hsu et al. U.S. Pat. No. 6,041,410 discloses a key fob with biometric identification.

It would be of great advantage if a system could be developed that would combine entry and egress needs of persons in conjunction with various assets that the person or persons may need to use, to move, or to do both.

Another advantage would be if a system using biometrics could be simple and economically integrated into facility control of personnel and the facility assets that is assigned to each such person for use or transportation.

Yet another advantage would be a system using biometrics and RFID technology in which the signals being transmitted are encrypted to prevent tampering or interception of the signals by others seeking to defeat the system.

Other advantages and features will appear hereinafter.

SUMMARY OF THE INVENTION

The present invention provides a system for controlling access at secure facilities to locations and assets contained in those locations. Typical locations are banks, research facilities, prisons, military facilities, hospitals and other treating centers, clinics, factories, offices and the like. The assets include laptops, desktop computers, photographic equipment, weapons such as rifles, data storage systems and groups thereof.

The system includes a location at a secure facility and having an access door controlled by a lock mechanism and at least one asset contained in the location, the asset having an asset RFID tag mounted thereon to permit or deny access to the asset, such as a computer, and also permit or deny removal of the asset, such as a firearm, from the location by the person having access to the location. The system could also be integrated with the asset to disarm or lock the asset if it is removed.

A biometric identification device is positioned for access by a person to read at least one biometric feature of a person.

Examples of biometric features can include iris, retina, fingerprint, tissue hydration, optical patent length differences, DNA, and skin oil.

The person carries a personal RFID tag adapted to interact with the biometric device and transmit readings from the biometric device to an RFID receiver for receiving and transmitting signals based on signals from any RFID tag in the system. The RFID receiver signal is processed by a programmable device such as a computer and includes a comparator for comparing biometric data from the RFID signal with a biometric data base or template. The comparator determines the existence or absence of an approved identification from an access database in the database. Upon determining an approved identification, the signal is adapted to selectively contact the locking mechanism to permit entry into the location and to permit or deny access to the at least one asset via the asset RFID tag.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION OF THE PREFERRED EMBODIMENT

Figure 1:
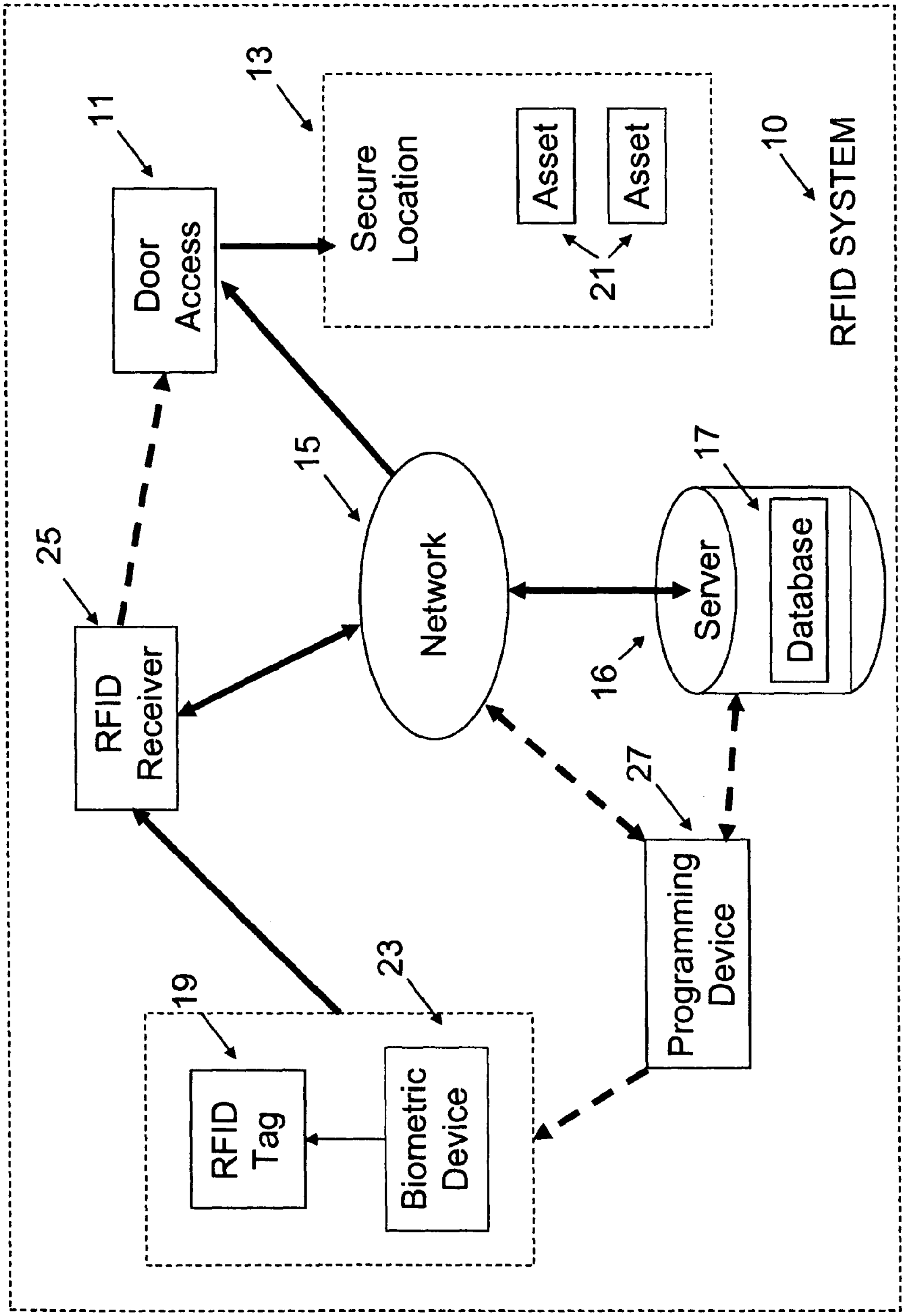
FIG. 1 is a schematic diagram of the present invention showing the system.

Referring to the figures, FIG. 1 shows the system, 10 generally, in which a secure location in a facility has a door access control mechanism 11 which permits or denies access to the location 13 by locking or unlocking control mechanism 11. A network 15 is in operable relationship with a server having a server 16 and database 17. A RFID tag 19 is provided to each individual who may have reason to access location 13 through door access control mechanism 11 and to use at least one asset 21 in the secure location 13. Tag 19 communicates with a biometric device 23 and signals a RFID receiver 25, which in turn communicates with the network 15 and database 17.

Examples of biometric features can include iris, retina, fingerprint, tissue hydration, optical patent length differences, DNA, and skin oil. In the case of an iris scan, for example, the person activates the scanner with his or her tag 19 and looks into device 23. The data is transmitted to the receiver 25 and processed. Biometric feature templates are stored in the database 17.

Figure 2:
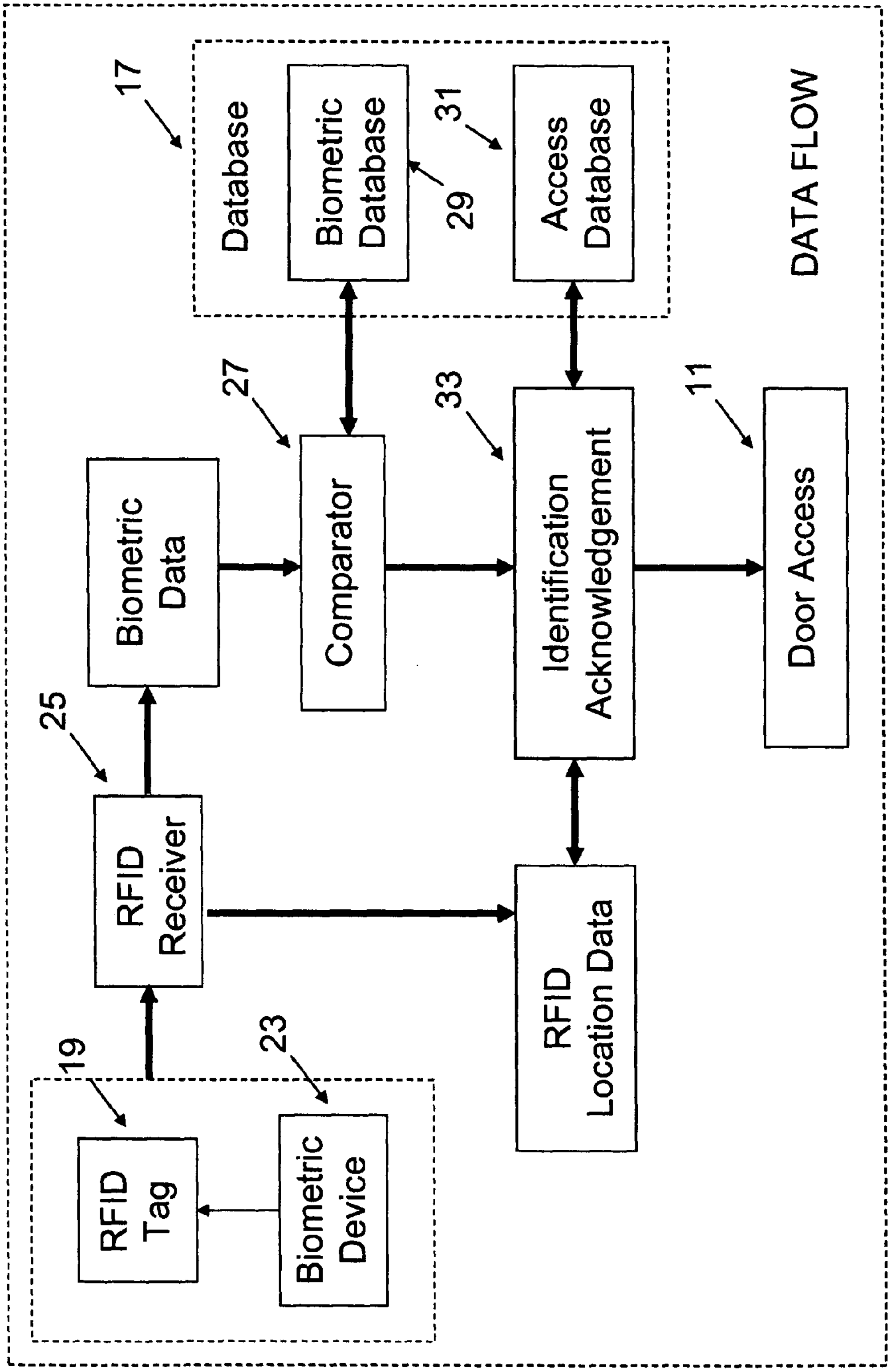
FIG. 2 is a schematic diagram of details of the system shown in FIG. 1 used to implement biometric data flow.

The RFID tag 19 communicates with the RFID receiver 25. The receiver 25 communicates with the database 17 through the network 15. Then either the server controls the door access 11 or it can be controlled by the nearest RFID receiver 25. This would be preferred if the network failures. A programming device 27 shown in FIG. 2 is needed to enroll and add templates to the biometric device if there were biometric information stored on the RFID tag, such as a finger print. It would not be necessary if the person put his or her finger or fingers on a biometric fingerprint reader that would transmit the fingerprint to the receiver 25. Then the enrollment would be done on the server 16 or through the network 15 to the server 16. p Referring to FIG. 2, the biometric template is collected at device 23 and passed through the receiver 25, then to the comparator 27. Comparator 27 compares the template to the templates stored in the database 17 and looks for a match. The template information may be stored in several locations. One would be a server 16 where everyone's data is stored. It could also be stored in the RFID tag 19 since there would only be one tag per person or one template stored in the device. Another location for the template would be the RFID Receiver 25 where it could have all of the templates for the all of the people that have access to the door it controls.

Once a match has been found the system needs to check to see if the person has access privileges to the door that is at the location. This information as well could be on the server 16 or even in the RFID Tag 19, or only the doors the specific RFID tag can open. The most reasonable place would be the RFID receiver 25 since it determines the location of the asset 21. Once the receiver gets both the ID and it has access the server 16 or the receiver 25 would open the door 11 to location 13. In many facilities, all of the doors are hardwired to the main controller in the network 15. Another way is to have the door 11 wired to the RFID receiver 25 which would control it.

The RFID Tag 19 could be on a person or a valuable asset 21 that would not be allowed to be removed unless the person moving the asset 21 could be biometrically identified. For example, a person may have access to a computer or laptop, or some other valuable asset 21, to perform data entry, make calculations, and the like, but would not have permission to remove the asset 21, thus preventing the taking data outside a secure location. If, for example, the assets 21 were firearms in a prison, only assigned guards would be able to take the firearm from the store room or armory, and an alarm would sound if an unauthorized person took the firearm. A smart firearm could also be disabled.

There are many possibilities for secure control of access to locations and use and/or movement of valuable assets 21. The system of this invention permits protection of places and things by permitting or denying access to them by persons who have been biometrically screened for such access.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

The embodiments of the invention in which an exclusive property or right is claimed are defined as follows. Having thus described the invention what is claimed is:

1. A system for controlling access by a person at secure facilities to locations and assets contained in those locations, comprising:

- a location at a secure facility that a person accesses or leaves through an access point controlled by a lock mechanism;
- a biometric reader fixedly located proximate to the access point and positioned such that the person interacts with the biometric reader to produce at least one new biometric feature reading;
- a personal RFID tag storing data comprising personal tag data wherein the personal RFID tag is carried by the person and wherein the biometric reader passes the new biometric feature reading to the personal RFID tag;
- an RFID receiver that queries the personal RFID tag to obtain the personal tag data and the new biometric feature reading;

a prior biometric feature reading that was previously obtained; and a comparator that compares the prior biometric feature reading and the new biometric feature reading and wherein the locking mechanism permits the person to transit the access point only when the prior biometric feature reading matches the new biometric.

2. The system of claim 1 wherein the personal ag data comprises the prior biometric feature reading.

3. The system of claim 1 further comprising an asset within the location wherein an asset RFID tag is fixed to the asset, wherein the RFID receiver obtains asset data from the asset RFID tag, and wherein the comparator produces a second signal that permits or denies operation of asset.

4. The system of claim 1 further comprising an asset within the location wherein an asset RFID tag is fixed to the asset, wherein the RFID receiver obtains asset data from the asset RFID tag, and wherein the comparator produces a second signal that disables the asset.

5. The system of claim 1 further comprising an asset within the location wherein an asset RFID tag is fixed to the asset, wherein the RFID receiver obtains asset data from the asset TFID tag, and wherein the comparator produces a second signal that permits or denies removal of the asset from the location.

6. The system of claim 1 wherein the personal tag data comprises an identifier, wherein the RFID receiver stores storing a plurality of previously obtained biometric feature readings comprising the prior biometric feature and wherein the prior biometric feature reading is associated with the identifier.

7. The system of claim 1 further comprising a database storing a plurality of previously obtained biometric feature readings, wherein the personal tag data comprises the prior biometric feature reading, and wherein the person is allowed to transit the access point only when the prior biometric feature reading and the new biometric feature reading match one of the previously obtained biometric feature readings.

8. The system of claim 1 wherein the personal RFID tag is a vicinity card.

9. The system of claim 1 wherein the personal RFID tag is a proximity card.

10. The system of claim 1 wherein the personal RFID tag is a close coupled card.

11. The system of claim 1 wherein the person RFID tag is a non-powered RFID tag.

12. A system for controlling access by a person at secure facilities to locations and assets contained in those locations, comprising:

a location that a person accesses or leaves through an access point controlled by a lock mechanism;

a biometric reader fixedly located proximate to the access point and positioned such that the person interacts with the biometric reader to produce at least one new biometric feature reading;

a personal RFID tag storing data comprising personal tag data wherein the personal RFID tag is carried by the person, and wherein the biometric reader passes the new biometric feature reading to the personal RFID tag;

an RFID receiver that queries the personal RFID tag to obtain the personal tag data and the new biometric feature reading;

an asset within the location wherein an asset RFID tag is fixed to the asset and wherein the RFID receiver obtains asset data from the asset RFID tag;

a prior biometric feature reading that was obtained prior to the person interacting with the biometric reader; and comparator that examines the prior biometric feature reading, the new biometric feature reading, and the asset data to permit or deny access to the asset and wherein the locking mechanism permits the person to transit the access point only when the person is permitted to access the asset.

13. The system of claim 12 wherein the personal RFID tag is non-powered.

14. The system of claim 12 wherein the asset RFID tag is non-powered.

15. The system of claim 12 wherein the personal RFID tag is non-powered and wherein the asset RFID tag is non-powered.

16. A system comprising:

a location where a person accesses an asset wherein an asset RFID tag is fixed to the asset;

a personal RFID tag storing data comprising personal tag data wherein the personal RFID tag is carried by the person;

an RFID receiver that queries the personal RFID tag to obtain the personal tag data and queries the asset RFID tag to obtain asset data;

comparator that examines the personal tag data and the asset data to permit or deny use of the asset and wherein the comparator produces a signal that causes the asset to be disabled unless the person is permitted to use the asset an access point that the person traverses to enter or leave the location;

a biometric reader fixedly located proximate to the access point and positioned such that the person interacts with the biometric reader to produce at least one new biometric feature reading, wherein the biometric reader passes the new biometric feature reading to the personal RFID tag, wherein the RFID receiver that queries the personal RFID tag to obtain the new biometric feature reading; and a prior biometric feature reading that was obtained prior to the person interacting with the biometric reader wherein the comparator also examines the prior biometric reading and the new biometric reading to determine if the person is permitted to use the asset.

17. The system of claim 16 wherein the personal RFID tag is non-powered.

18. The system of claim 16 wherein the asset RFID tag is non-powered.

19. The system of claim 16 wherein the personal RFID tag is non-powered and wherein the asset RFID tag is non-powered.

* * * * *